United States Patent
Harshman et al.

(10) Patent No.: US 10,731,625 B1
(45) Date of Patent: Aug. 4, 2020

(54) BEARING RETAINER ASSEMBLY FOR A HYDROSTATIC TRANSMISSION

(71) Applicant: Hydro-Gear Limited Partnership, Sullivan, IL (US)

(72) Inventors: B. Keith Harshman, Sullivan, IL (US); Ryan D. Gagnon, Kirksville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 15/988,786

(22) Filed: May 24, 2018

Related U.S. Application Data

(60) Provisional application No. 62/511,830, filed on May 26, 2017.

(51) Int. Cl.
| | | |
|---|---|---|
| F03C 1/06 | (2006.01) | |
| F04B 1/2085 | (2020.01) | |
| F01B 3/00 | (2006.01) | |
| F04B 1/2078 | (2020.01) | |
| F16H 39/14 | (2006.01) | |
| F16C 17/04 | (2006.01) | |

(52) U.S. Cl.
CPC .......... *F03C 1/0671* (2013.01); *F03C 1/0663* (2013.01); *F16C 17/04* (2013.01); *F16H 39/14* (2013.01); *F01B 3/007* (2013.01); *F01B 3/0073* (2013.01); *F04B 1/2078* (2013.01); *F04B 1/2085* (2013.01); *F16C 2326/06* (2013.01)

(58) Field of Classification Search
CPC .... F04B 1/2078; F04B 1/2085; F01B 3/0073; F01B 3/007; F03C 1/0668; F03C 1/0671
See application file for complete search history.

(56) References Cited

U.S. PATENT DOCUMENTS

| | | | | |
|---|---|---|---|---|
| 782,768 | A | | 2/1905 | Thorn |
| 2,331,694 | A | * | 10/1943 | Jeffrey ................. F01B 3/0032 91/485 |
| 3,495,543 | A | * | 2/1970 | Millard ................. F01B 3/0035 91/485 |
| 5,074,195 | A | | 12/1991 | Ohashi et al. |
| 9,664,270 | B1 | | 5/2017 | Langenfeld |

OTHER PUBLICATIONS

Dodge Catalog, Specialty Tapered Products, Date unknown but at least as early as May 23, 2018.

* cited by examiner

*Primary Examiner* — F Daniel Lopez
*Assistant Examiner* — Michael Quandt
(74) *Attorney, Agent, or Firm* — Neal, Gerber & Eisenberg LLP

(57) ABSTRACT

A thrust bearing assembly is provided for the pistons of a hydrostatic drive motor. The thrust bearing assembly includes first and second retainer components removably interconnected to form a retainer assembly, a thrust bearing captured between and encompassed by the first and second retainer components, and locking tangs extending outward from the first and second retainer components. Corresponding catches are formed on the internal surface of the housing to engage the locking tangs when the thrust bearing assembly is installed in the housing.

19 Claims, 4 Drawing Sheets

BEARING RETAINER ASSEMBLY FOR A HYDROSTATIC TRANSMISSION

CROSS-REFERENCE

This application claims the benefit of U.S. Provisional Patent Application No. 62/511,830, filed on May 26, 2017, which is incorporated herein in its entirety.

BACKGROUND OF THE INVENTION

This application relates to hydraulic drive mechanisms and hydrostatic transmissions generally and, in particular, to transmissions intended for use in driving a vehicle or other powered machine or apparatus, such as a lawn mower.

SUMMARY OF THE INVENTION

An improved hydrostatic drive apparatus, or hydrostatic transmission, is disclosed herein, as described in more detail below. The drive apparatus can be mounted on a vehicle or other powered machine or apparatus. More specifically, an improved thrust bearing assembly for use in a hydrostatic transmission is disclosed. The disclosure herein, and in particular the specific features of a transmission, can be used in conjunction with a transmission such as that shown in commonly-owned U.S. Pat. No. 9,664,270. The contents and teachings of this patent are incorporated herein by reference in their entirety.

In an embodiment of this disclosure, the hydrostatic drive apparatus comprises a housing forming an internal sump, the housing consisting of at least a main housing and a motor cover. A motor is disposed in the internal sump and comprises a motor cylinder block disposed on a motor running surface, an output shaft driven by the motor cylinder block, a plurality of motor pistons and a thrust bearing assembly having a bearing surface to oppose and generally rotate with the plurality of motor pistons. The thrust bearing assembly comprises a plurality of retainer components removably interconnected to one another. In the disclosed embodiment, the plurality of retainer components comprises a first retainer and a second retainer, and the thrust bearing assembly further comprises a thrust bearing captured between the first retainer and the second retainer, a first locking tang extending outwardly from the first retainer and a second locking tang extending outwardly from the second retainer. The first and second retainers may be composed of nylon 6-6, 30% glass, while the thrust bearing may be of typical steel construction. Other materials could be used depending on the application. In the disclosed embodiment, the motor cover comprises a pair of catches formed on an internal surface thereof, each of the pair of catches engaging one of the first locking tang or the second locking tang when the thrust bearing assembly is installed in the motor cover.

In another aspect of this disclosure, the assembled first and second retainers form a first retaining rim engaging a first side of the thrust bearing and having a first thickness, and a second retaining rim engaging a second side of the thrust bearing and having a second thickness that is greater than the first thickness.

In another aspect of this disclosure, the first retainer comprises a pair of alignment slots and the second retainer comprises a pair of alignment tabs, wherein each of the pair of alignment tabs fits into a corresponding one of the pair of alignment slots.

In another aspect of this disclosure, the thrust bearing comprises a bearing surface to oppose the plurality of motor pistons, and the first retainer and the second retainer each comprise a first surface that is generally parallel to the bearing surface when the first retainer and the second retainer are assembled with the thrust bearing.

In another aspect of this disclosure, the first locking tang extends generally perpendicular to the first surface of the first retainer and the second locking tang extends generally perpendicular to the first surface of the second retainer. In another aspect of this disclosure, the first retainer and the second retainer each comprise a main body that is generally semi-circular in shape. As used herein, the terms "generally parallel," "generally perpendicular," "generally semi-circular" and the like should be read to encompass normal engineering tolerances and design variations that might be dictated by a specific application.

A better understanding of the invention will be obtained from the following detailed descriptions and accompanying drawings, which set forth one or more illustrative embodiments indicative of the various ways in which the principals of the invention may be employed.

DETAILED DESCRIPTION OF THE DRAWINGS

Figure 1:
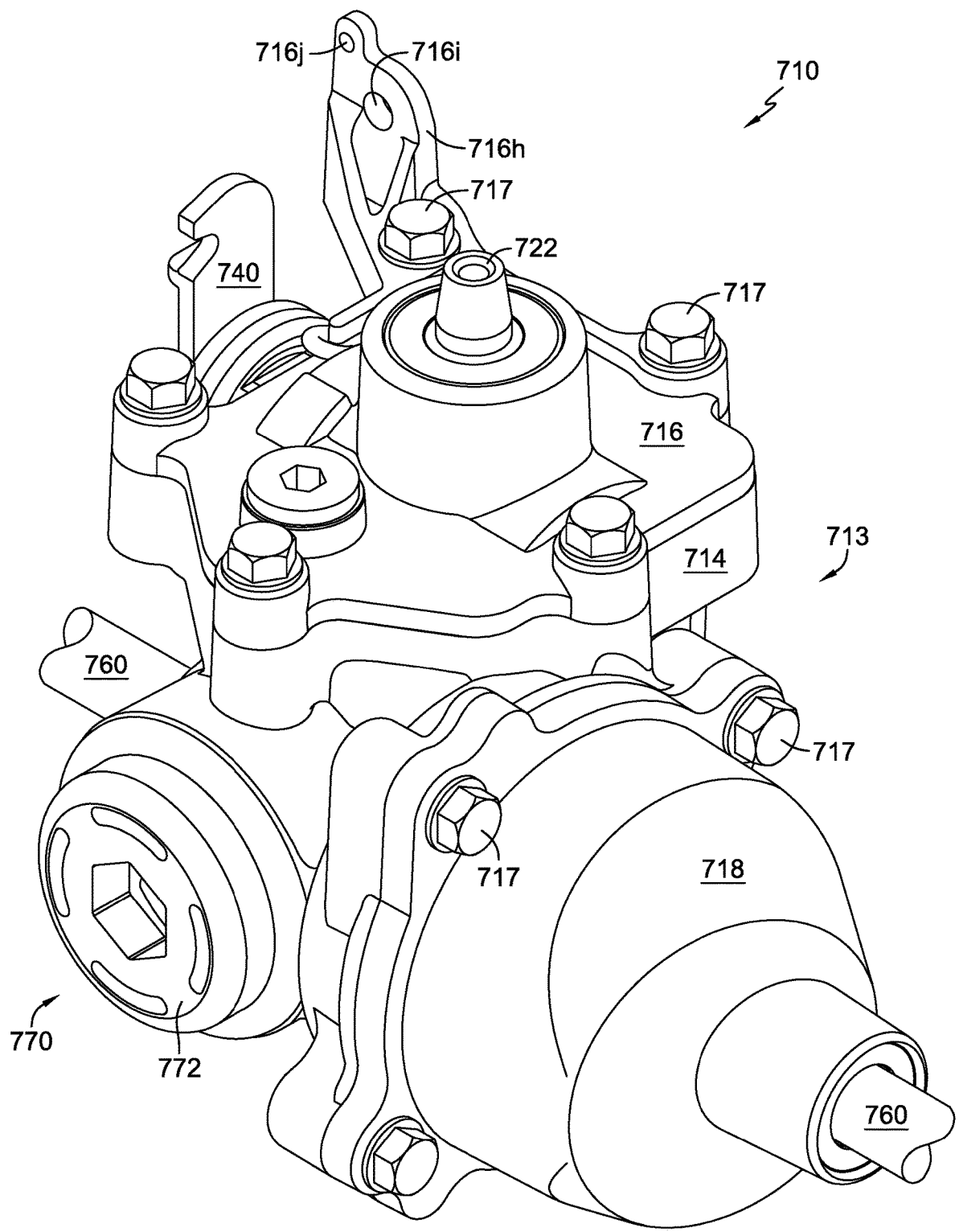
FIG. 1 is a perspective view of a hydrostatic transmission in accordance with one embodiment of the teachings herein.

The description that follows describes, illustrates and exemplifies one or more embodiments of the invention in accordance with its principles. This description is not provided to limit the invention to the embodiment(s) described herein, but rather to explain and teach the principles of the invention in order to enable one of ordinary skill in the art to understand these principles and, with that understanding, be able to apply them to practice not only the embodiment(s) described herein, but also any other embodiment that may come to mind in accordance with these principles. The scope of the invention is intended to cover all such embodiments that may fall within the scope of the claims, either literally or under the doctrine of equivalents. This specification is intended to be taken as a whole and interpreted in accordance with the principles of the invention as taught herein and understood by one of ordinary skill in the art.

Transmission 710 includes a housing assembly 713 comprising a main housing 714, a pump cover 716 and a motor cover 718 joined by means of various fasteners 717 to form an internal sump, including internal pump chamber 706. Pump cover 716 includes an integrally formed extension 716h for the attachment of one or more linkages thereto. For example, linkage opening 716i is provided for a control cable and auxiliary opening 716j is provided for attaching a belt tensioner spring.

Input shaft 722 provides a rotational input to the hydraulic pump, not shown, but which may be an axial piston pump or a gerotor or other type of pump. In the present embodiment, the pump would be an axial piston pump and control would be provided thereto by means of a control arm 740 in a known manner. Reference is made to the previously incorporated U.S. Pat. No. 9,664,270 for details of such a pump and its control. A fluid expansion bladder assembly 770 is also provided, along with bladder cap 772.

Figure 3:
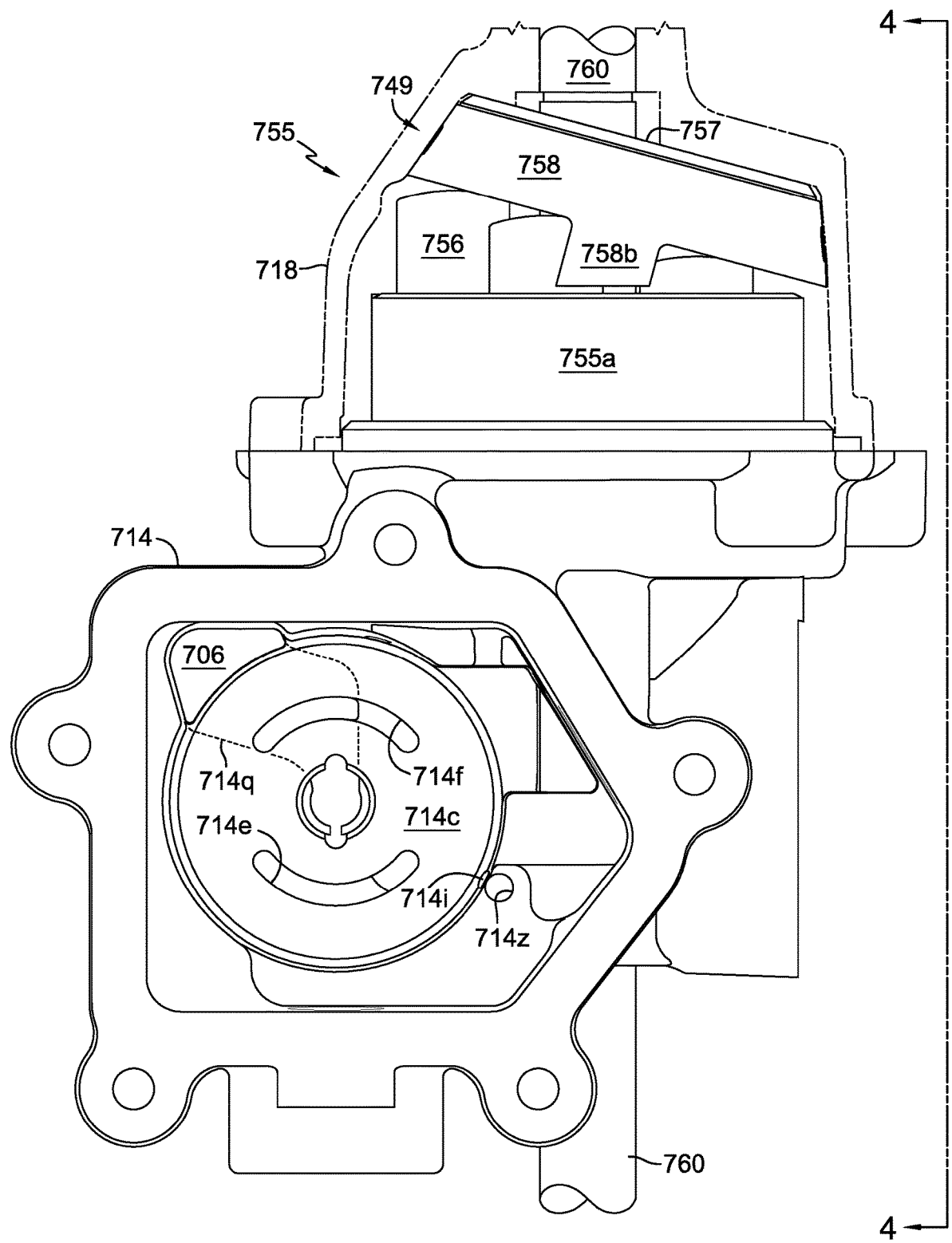
FIG. 3 is a top plan view of the hydrostatic transmission of FIG. 1, with certain housing elements removed or shown in phantom to show the internal structure of the transmission.
Figure 4:
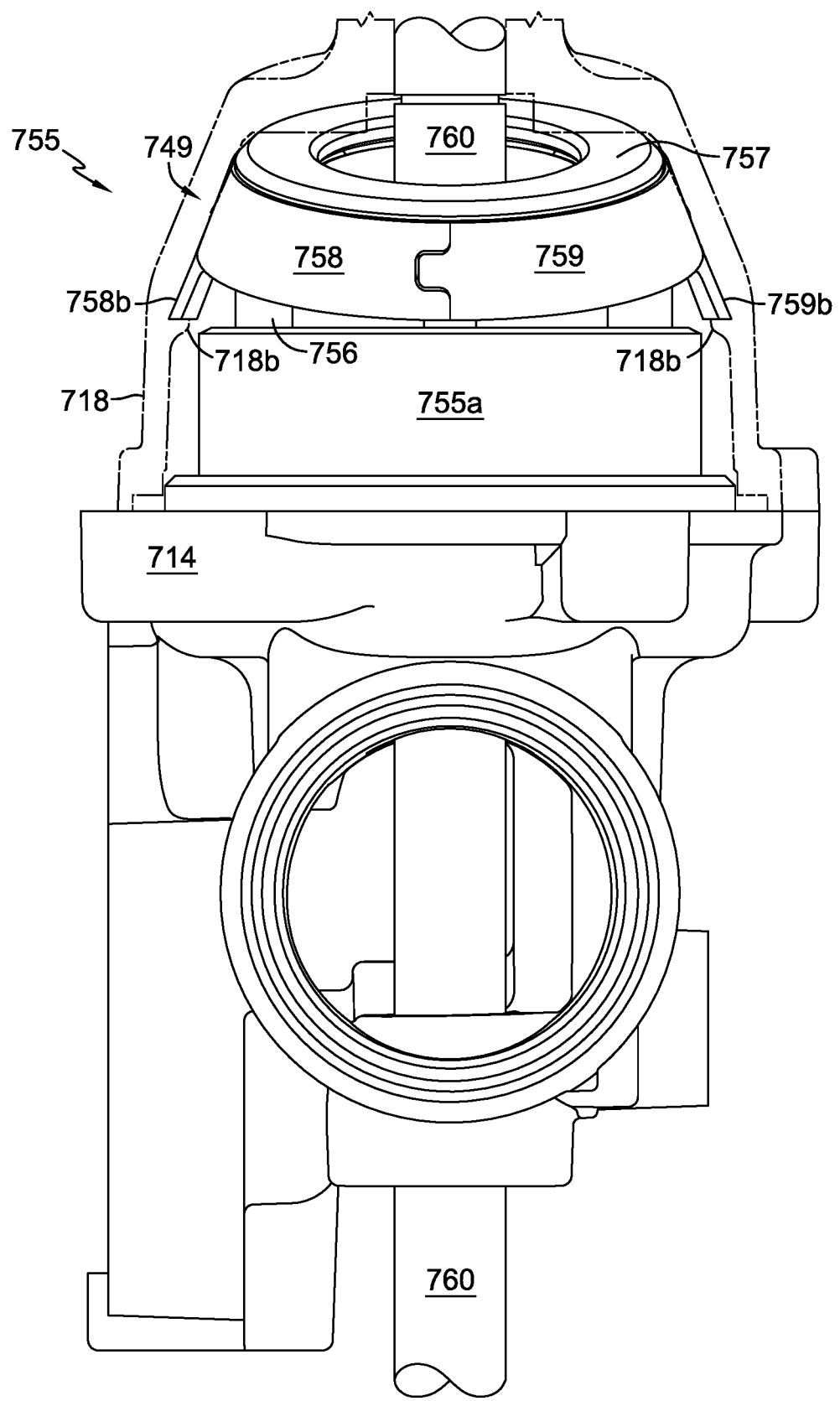
FIG. 4 is a side elevational view along the line 4-4 in FIG. 3, with certain housing elements removed or shown in phantom to show the internal structure of the transmission.

FIGS. 3 and 4 show a portion of transmission 710 with pump cover 716 removed and with motor cover 718 shown in phantom to depict the internal structure more clearly. Main housing 714 includes a pump running surface 714c having fluid ports 714e and 714f formed thereon to connect the pump cylinder block (not shown) with the hydraulic porting, which is also connected to motor cylinder block 755a. The hydraulic porting includes fluid pressure relief passage 714i, pump inlet passage 714q and valve support opening 714z formed in main housing 714.

Figure 2:
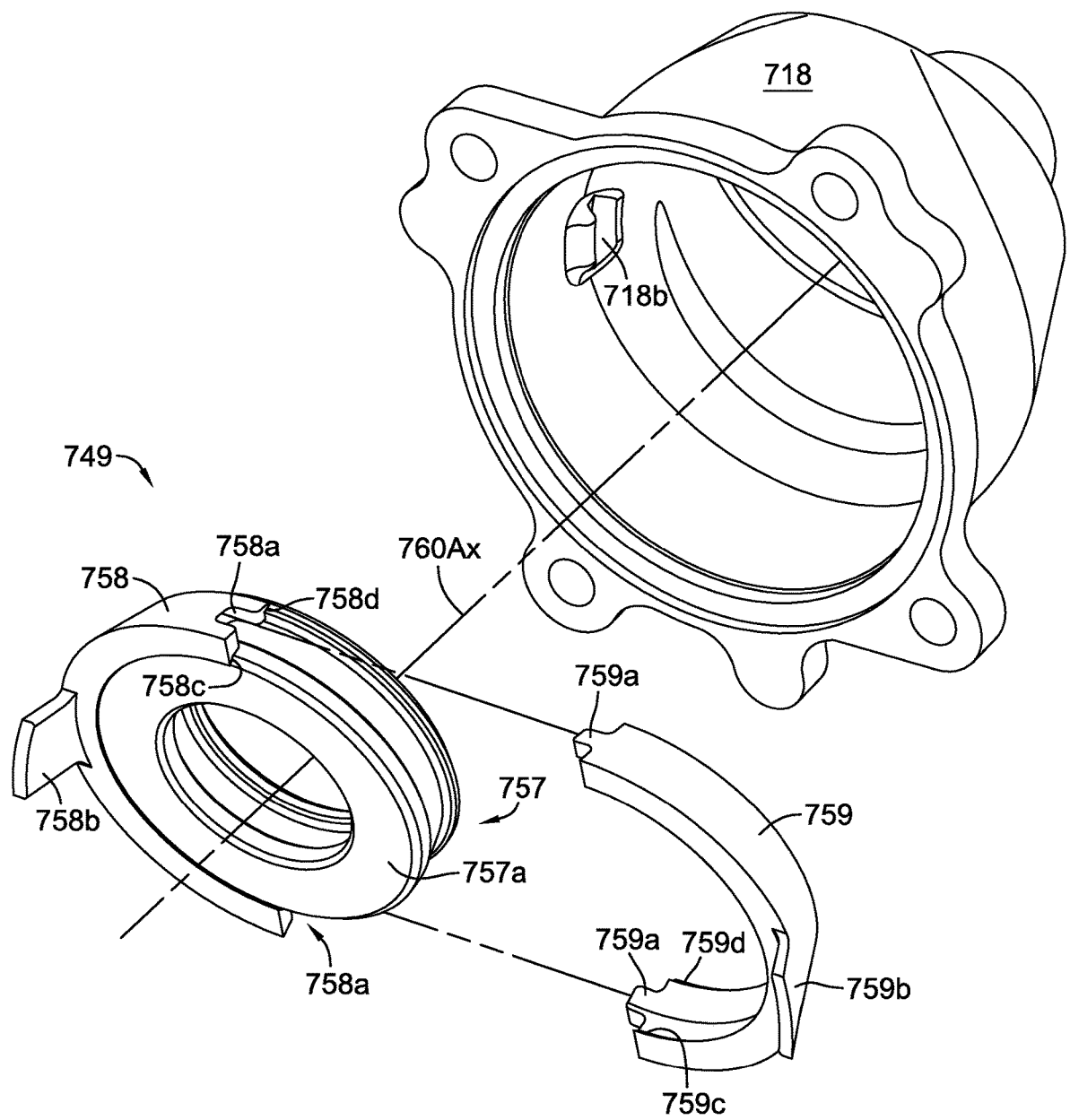
FIG. 2 is an exploded perspective view of certain components of the hydrostatic transmission of FIG. 1, namely the motor cover and the thrust bearing assembly.

Axial piston motor assembly 755 comprises a motor cylinder block 755a, a set of axial pistons 756 and thrust bearing assembly 749. Motor cylinder block 755a is disposed on a motor running surface (not shown) on main housing 714. A motor output shaft 760, having a rotational axis 760Ax shown in FIG. 2, is engaged to and driven by motor cylinder block 755a and, as shown in FIG. 1, extends out both sides of the transmission 710. Reference is again made to U.S. Pat. No. 9,664,270 for details of such a motor and the features thereof.

With reference to FIG. 2, it can be seen that motor cover 718 is adapted to receive the thrust bearing assembly 749, which consists of a motor thrust bearing 757 that is captured between and retained by a retainer assembly formed by a plurality of retainer components. In the depicted embodiment, first and second retainers 758 and 759 are preferably removably interconnected to form the retainer assembly portion of thrust bearing assembly 749. As shown in FIG. 4, motor output shaft 760 extends entirely through thrust bearing assembly 749. Thrust bearing 757 includes a thrust or bearing surface 757a that opposes the thrust force of the plurality of motor pistons 756. Although motor pistons 756 and the opposing bearing race (comprising bearing surface 757a) generally rotate together about the motor output shaft axis 760Ax, some normal slippage occurs at the contact interface of these lubricated components during operation of transmission 710. The first and second retainers 758 and 759 must be properly formed and toleranced to allow relatively free rotation of the bearing race comprising bearing surface 757a when assembled about the thrust bearing 757. A proper fit of the retainer assembly 758, 759 encompassing the thrust bearing 757 is required to prevent excessive friction and wear of motor pistons 756 and various components of the thrust bearing assembly 749. Retainer 758 comprises a pair of alignment slots 758a that removably interconnects with a corresponding pair of alignment tabs 759a formed on retainer 759. When assembled, the generally semi-circular main bodies of retainers 758, 759 comprise a first rim 758c, 759c that extends in a radial direction (i.e., toward the center of thrust bearing 757) and a second rim 758d, 759d that extends in a generally axial direction (i.e., in a direction generally perpendicular to that of the first rim). The first rim 758c, 759c and the second rim 758d, 759d cooperate to properly retain the thrust bearing 757. It will be understood that the directions in which the first and second rims extend need not be perfectly perpendicular to one another to accomplish this retention of thrust bearing 757. The actual rim profiles must be designed to conform to the profile of the selected thrust bearing 757 which is preferably a standard commercial bearing (although it may alternatively be a specialized bearing of non-standard size, material, etc.).

As shown most clearly in FIGS. 2 and 4, the assembled thrust bearing assembly 749 is "cup shaped" and tapered. More specifically, the thickness of assembled retainers 758, 759 decreases as one moves from a first side, adjacent retaining rims 758c, 759c, to a second side adjacent retaining rims 758d, 759d. In other words, the outer circumference of the assembled retainers 758, 759 decreases from the first side to the second side. Thus, the thrust bearing assembly 749 fits inside the angled inner surface of motor cover 718.

Locking tangs 758b, 759b form an engagement mechanism and extend outward sufficiently from the respective retainers 758, 759 to allow deflection of the tangs 758b, 759b during installation of the thrust bearing assembly 749. When thrust bearing assembly 749 is inserted into motor cover 718, this engagement mechanism encounters a locking mechanism comprising a pair of catches 718b disposed inside motor cover 718 that secure the thrust bearing assembly 749 in place, as shown most clearly in FIG. 4. The catches 718b each comprise a ramp or similar structure to deflect the locking tangs 758b, 759b during insertion of thrust bearing assembly 749 inside the motor cover 718. When the tangs 758b, 759b clear the ramps or similar structures formed on the pair of catches 718b, they then spring outward to lock the thrust bearing assembly 749 inside the motor cover 718.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims and any equivalent thereof.

We claim:

1. A drive apparatus, comprising:
   a housing having an internal surface forming a sump;
   a motor disposed in the sump and comprising a motor cylinder block disposed on a motor running surface, an output shaft driven by the motor cylinder block, and a plurality of motor pistons;
   a thrust bearing assembly in contact with the plurality of motor pistons, the thrust bearing assembly comprising:
      a first retainer and a second retainer removably interconnected to form a retainer assembly;
      a thrust bearing disposed between the first retainer and the second retainer, the thrust bearing comprising a bearing surface to oppose the plurality of motor pistons; and
      a first locking tang extending outwardly from the first retainer and a second locking tang extending outwardly from the second retainer; and
   a pair of catches formed on the internal surface of the housing, each of the pair of catches engaging one of the first locking tang or the second locking tang when the thrust bearing assembly is installed in the housing.

2. The drive apparatus of claim 1, wherein the first retainer and the second retainer combine to form a first retaining rim engaging a first side of the thrust bearing and a second retaining rim engaging a second side of the thrust bearing.

3. The drive apparatus of claim 2, wherein a first side of the retainer assembly adjacent the first retaining rim has a first thickness, and a second side of the retainer assembly adjacent the second retaining rim has a second thickness, wherein the first thickness is greater than the second thickness.

4. The drive apparatus of claim 3, wherein the first retainer comprises a pair of alignment slots and the second retainer comprises a pair of alignment tabs, wherein each of the pair of alignment tabs fits into a corresponding one of the pair of alignment slots.

5. The drive apparatus of claim 1, wherein the first retainer and the second retainer each comprise a first surface that is generally parallel to the bearing surface when the first retainer and the second retainer are assembled with the thrust bearing, and the first locking tang extends generally perpendicular to the first surface of the first retainer and the second locking tang extends generally perpendicular to the first surface of the second retainer.

6. The drive apparatus of claim 5, wherein the retainer assembly comprises a first retaining rim engaging a first side of the thrust bearing adjacent to the bearing surface, and a second retaining rim engaging a second side of the thrust bearing, and wherein a first side of the retainer assembly adjacent the first surface has a first thickness, and a second side of the retainer assembly adjacent the second side has a second thickness, and the first thickness is greater than the second thickness.

7. The drive apparatus of claim 6, wherein the housing comprises a main housing and a motor cover, and a motor cover portion of the internal surface is angled to accommodate the shape of the retainer assembly.

8. The drive apparatus of claim 1, wherein the output shaft extends entirely through the thrust bearing assembly.

9. A drive apparatus, comprising:
   a housing forming a sump;
   a motor disposed in the sump and comprising a plurality of motor pistons located in a cylinder block; and
   a thrust bearing assembly in contact with the plurality of motor pistons, the thrust bearing assembly comprising:
      a plurality of retainer components interconnected to form a retainer assembly, the plurality of retainer components comprising a first retainer having a first body that is generally semi-circular in shape, and a second retainer having a second body that is generally semi-circular in shape; and
      a thrust bearing disposed between the plurality of retainer components, the thrust bearing comprising a first side, a second side opposite the first side, and a bearing surface disposed on the first side for opposing the plurality of motor pistons, the bearing surface of the thrust bearing being rotatable with respect to the retainer assembly;
   wherein the retainer assembly engages the thrust bearing adjacent the first side of the thrust bearing, and engages the thrust bearing adjacent the second side of the thrust bearing.

10. The drive apparatus of claim 9, further comprising a locking mechanism formed on an internal surface of the housing and an engagement mechanism on the thrust bearing assembly to engage the locking mechanism and retain the thrust bearing assembly in the housing.

11. The drive apparatus of claim 10, wherein the engagement mechanism comprises a first tang extending outwardly from the first retainer and a second tang extending outwardly from the second retainer, and the locking mechanism comprises a pair of catches formed on the internal surface of the housing, each of the pair of catches securing one of the first tang and the second tang when the thrust bearing assembly is installed in the housing.

12. The drive apparatus of claim 11, wherein the first tang extends generally perpendicular to a first surface of the first retainer and the second tang extends generally perpendicular to a first surface of the second retainer.

13. The drive apparatus of claim 9, wherein the retainer assembly comprises a first retaining rim engaging the thrust bearing adjacent the first side of the thrust bearing, and a second retaining rim engaging the thrust bearing adjacent the second side of the thrust bearing.

14. The drive apparatus of claim 13, wherein the first retaining rim extends in a generally radial direction with respect to the thrust bearing and the second retaining rim extends in a generally axial direction with respect to the thrust bearing.

15. The drive apparatus of claim 14, wherein the retainer assembly has a first retainer side adjacent the bearing surface of the thrust bearing, and a second retainer side opposite the first retainer side, the first retainer side having a first circumference and the second retainer side having a second circumference that is less than the first circumference, whereby the retainer assembly is tapered and cup shaped.

16. The drive apparatus of claim 9, further comprising a hydraulic pump disposed in the housing, and wherein the housing further comprises a pump cover and a motor cover both attached to a main housing.

17. The drive apparatus of claim 9, wherein the first retainer is removably interconnected with the second retainer, and the bearing surface of the thrust bearing is rotatable with respect to the retainer assembly.

18. The drive apparatus of claim 9, wherein the retainer assembly has a first retainer side adjacent the bearing surface of the thrust bearing, and a second retainer side opposite the first retainer side, the first retainer side having a first circumference and the second retainer side having a second circumference that is less than the first circumference, whereby the retainer assembly is tapered and cup shaped.

19. A drive apparatus, comprising:
   a housing forming a sump;
   a motor disposed in the sump and comprising a plurality of motor pistons located in a cylinder block; and
   a thrust bearing assembly in contact with the plurality of motor pistons, the thrust bearing assembly comprising a plurality of retainer components interconnected to form a retainer assembly, and a thrust bearing disposed between the plurality of retainer components and having a bearing surface for opposing the plurality of motor pistons;
   wherein the retainer assembly has a first retainer side adjacent the bearing surface of the thrust bearing, and a second retainer side opposite the first retainer side, the first retainer side having a first circumference and the second retainer side having a second circumference that is less than the first circumference, whereby the retainer assembly is tapered and cup shaped.

* * * * *